United States Patent
Ott (10) Patent No.: US 6,697,828 B1
(45) Date of Patent: Feb. 24, 2004

(54) OPTIMIZED METHOD AND APPARATUS FOR PARALLEL LEADING ZERO/ONE DETECTION

(75) Inventor: Michael Ott, Pleasenton, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 610 days.

(21) Appl. No.: 09/586,658

(22) Filed: Jun. 1, 2000

(51) Int. Cl.[7] ................................................ G06F 7/00
(52) U.S. Cl. ...................................................... 708/211
(58) Field of Search ................................. 708/211, 205

(56) References Cited

U.S. PATENT DOCUMENTS

| | | | |
|---|---|---|---|
| 5,576,982 A | * 11/1996 | Wu et al. | 708/211 |
| 5,657,260 A | * 8/1997 | Makino | 708/211 |
| 5,805,486 A | 9/1998 | Sharangpani | |
| 6,195,637 B1 | * 2/2001 | Ballard et al. | 704/235 |
| 6,477,552 B1 | * 11/2002 | Ott | 708/211 |

* cited by examiner

Primary Examiner—Chuong Dinh Ngo
(74) Attorney, Agent, or Firm—Martine & Penilla, LLP (57) ABSTRACT

A method and apparatus for detecting leading zeros in a number represented by a plurality of four-bit nibbles, each nibble having an associated order of significance, said method comprising is disclosed. The leading zero detector calculates a leading zero count for each nibble in parallel, associates with each nibble count calculation a bit value inversely corresponding to the nibble's order of significance, and selects the nibble count calculation which corresponds to the highest order nibble without all zero values.

12 Claims, 5 Drawing Sheets

OPTIMIZED METHOD AND APPARATUS FOR PARALLEL LEADING ZERO/ONE DETECTION

BACKGROUND OF THE INVENTION

1. Field of the Invention

This invention pertains generally to parallel leading one/zero detection implementations. More particularly, the invention is an optimized system and method for a parallel leading one/zero detection in computer architectures.

2. The Prior Art

In microelectronics, the detection of leading zeros in a number is often required. For example, in floating-point addition, the result of an operation may require a left shift during normalization, as is known in the art.

Normalization is normally carried out using leading one/zero detection (LOZD) or leading one/zero anticipation (LOZA). In one example, a leading one/zero detector receives the result of the floating point addition, and counts the number of preceding zeros or ones in the result. This count is used to drive a shifter unit to produce the final normalized result.

Accordingly, there is an ongoing need for a system and method for detecting leading zeros and ones which improves the speed of the leading zero/one detection process. The present invention satisfies these needs, as well as others, and generally overcomes the deficiencies found in the background art.

BRIEF DESCRIPTION OF THE INVENTION

The present invention is an apparatus and method for parallel leading zero/one detection using a nibble calculation scheme. The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

The invention operates upon an operand, identified as OPERAND A. OPERAND A is represented by a plurality of nibbles, each nibble comprising four bits. For example, if OPERAND A comprises a thirty-two (32) bit number, OPERAND A is represented by eight (8) nibbles. Each nibble has a corresponding nibble placement within OPERAND A corresponding to a relative Nibble order of significance. For example, in the 32-bit OPERAND A example, Nibble 7 corresponds to bits 31, 30, 29, and 28 of OPERAND A, Nibble 6 corresponds to bits 27, 26, 25, and 24, Nibble 5 corresponds to bits 23, 22, 21 and 20, and Nibble 0 corresponds to bits 3, 2, 1 and 0. As will be readily apparent to those skilled in the art, each of the other nibbles 1, 2, 3, and 4 corresponds to bits associated with the nibble's placement within OPERAND A.

Each nibble has a corresponding relative nibble order of significance, such that nibbles having higher bits will have a higher order of significance than nibbles having lower bits. For example, Nibble 7 comprising bits 31, 30, 29, and 28 will have a higher order of significance than Nibble 6 corresponding to bits 27, 26, 25 and 24 since bits 31, 30, 29, and 28 have a higher order of significance than bits 27, 26, 25 and 24. Accordingly, Nibble n will have a higher order of significance than Nibble (n−1).

According to first embodiment of the present invention, the method for detecting leading zeros in a number comprises calculating a leading zero count for each nibble in parallel; associating with each nibble count calculation a bit value inversely corresponding to the nibble's order of significance; and selecting the nibble count calculation and its associated bit value which corresponds to the highest order nibble without all zero values.

According to another embodiment of the invention, the leading zero detector apparatus comprises a select circuit which receives as its input the number; a plurality of nibble analyzers, one nibble analyzer for each of the nibbles, each said nibble analyzer having as its input a corresponding nibble; and a filter circuit operatively coupled to said select circuit and said plurality of nibble analyzers.

It will be apparent to those skilled in the art having the benefit of this disclosure that the invention is also suitable for detecting leading ones using the parallel nibble calculation scheme of the present invention.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Referring more specifically to the drawings, for illustrative purposes the present invention is embodied in the apparatus shown FIG. 1 through FIG. 5. It will be appreciated that the apparatus may vary as to configuration and as to details of the parts, and that the method may vary as to details and the order of the acts, without departing from the basic concepts as disclosed herein. The invention is disclosed generally in terms of a leading zero detector with parallel nibble analysis, although numerous other uses for the invention will suggest themselves to persons of ordinary skill in the art.

The example embodiment of the invention described below and shown in FIG. 1 through FIG. 5 operates an a thirty-two (32) bit number although, the invention may be used with other bit size operands, as will be readily apparent to those skilled in the art having the benefit of this disclosure. Additionally, although the description below describes leading zero detection, the invention is also suitable for detecting leading ones using the parallel nibble calculation Referring first to FIG. 1, a block diagram of a leading zero detection implementation 10 using a parallel nibble calculation scheme in accordance with the present invention is shown.

Figure 1:
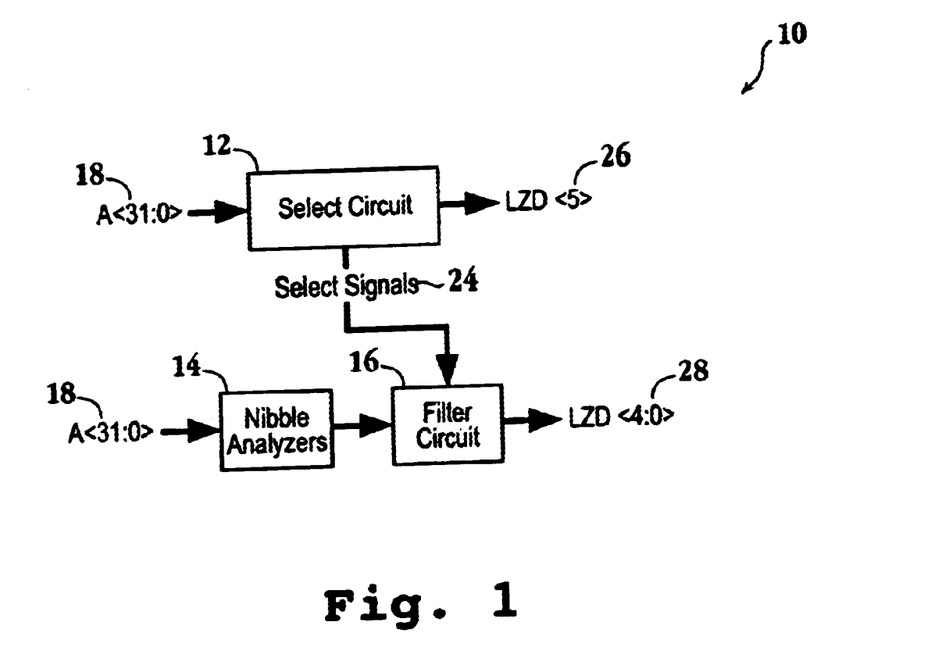
FIG. 1 is a functional block diagram of a leading zero detection implementation using parallel nibble calculation in accordance with the present invention.

Leading zero detector 10 comprises a select circuit 12, a nibble analyzer 14, and a filter circuit 16 operatively coupled to the select circuit 12 and the nibble analyzer 14. Leading zero detector 10 receives as its input an operand OPERAND A which in the present example comprises a 32-bit number. OPERAND A may be represented as A<31:0>18, which further identifies bits 0 through 31 of OPERAND A.

Figure 2:
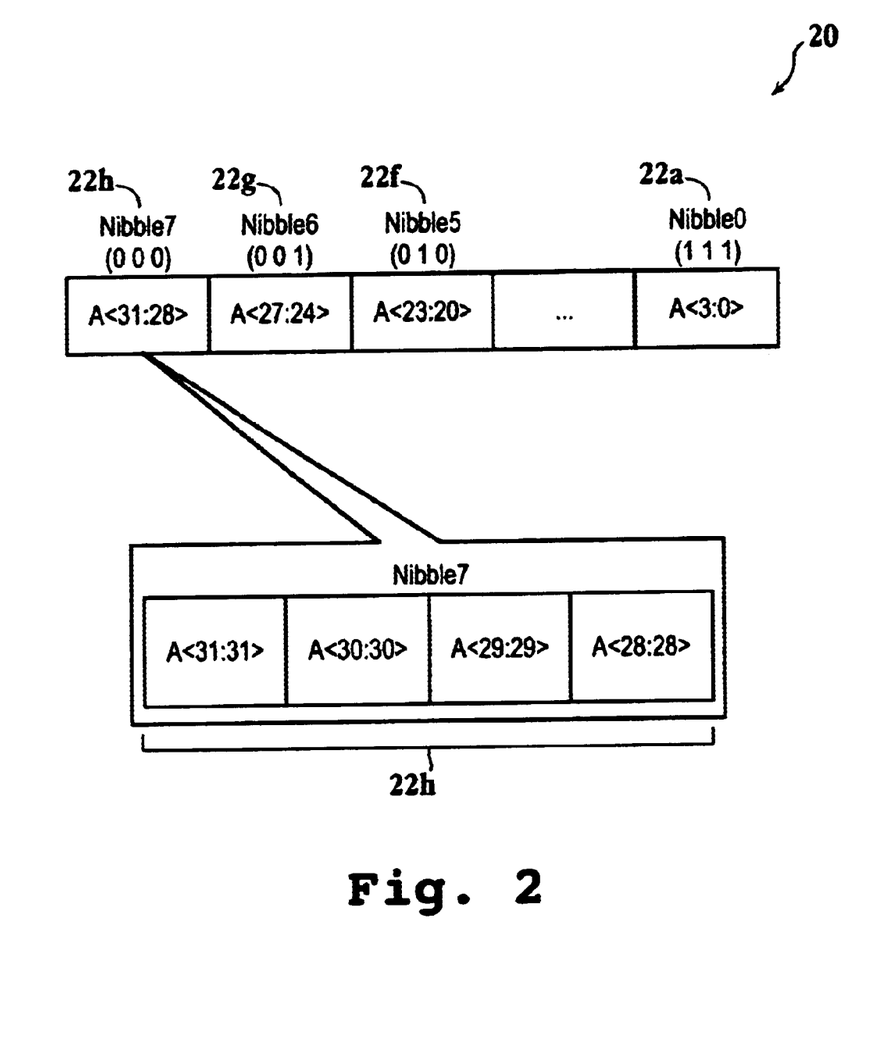
FIG. 2 is a block diagram depicting the nibble scheme structure of an operand in accordance with the present invention.

Referring to FIG. 2, the nibble scheme structure 20 of A<31:0>18 is shown. Each nibble of the nibble structure 20 comprises four (4) bits of the operand. Since A<31:0>18 comprises 32 bits, eight nibbles, identified as nibble 0 (22a) through nibble 7 (22h) are used to represent A<31:0>18. Nibble 0 (22a) comprises bits 0 through 3 of OPERAND A (A<3:0>). Nibble 1 (22b) comprises bits 4 through 7 of OPERAND A (A<7:4>). Nibble 2 (22c) comprises bits 8 through 11 of OPERAND A (A<1 1:8>). Nibble 3 (22d) comprises bits 12 through 15 of OPERAND A (A<15:12>). Nibble 4 (22e) comprises bits 16 through 19 of OPERAND A (A<19:16>). Nibble 5 (22f) comprises bits 20 through 23 of OPERAND A (A<23:20>). Nibble 6 (22g) comprises bits 24 through 27 of OPERAND A (A<27:24>). Nibble 7 (22h) comprises bits 28 through 31 of OPERAND A (A<31:28>).

Figure 3:
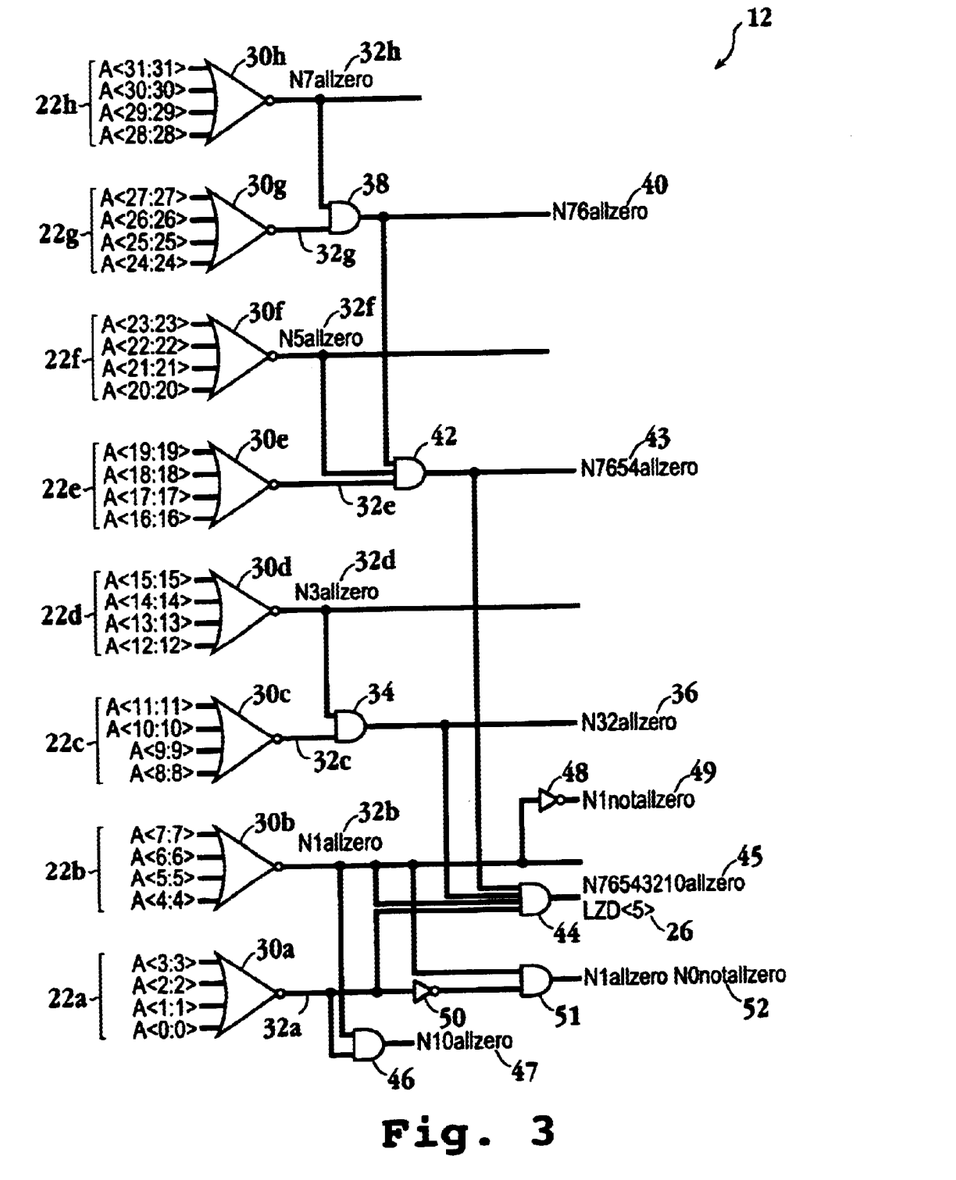
FIG. 3 is a block diagram of the select circuitry in accordance with the present invention.

Those skilled in the art will realized that a range of bits, such as bits n to n+c within a number (OPERAND A, for example), can be described using the notation A <n+c:n>. Individual bits, such as bit n, may also be described using the notation A <n:n> or A<n>. Thus, as shown in FIG. 3, bit 31 of Nibble 7 may be represented as A <31:31>. This notation is used herein to more particularly describe bits within operands and result values, including OPERAND A and the result of the leading zero detection (LZD) operation.

Each nibble 22a through 22h further has a corresponding relative nibble order of significance according to its position relative to other nibbles. Nibbles comprising higher bits will a have a higher order of significance than nibbles comprising lower bits. For example, Nibble 7 (22h) comprising bits 31, 30, 29, and 28 will have a higher order of significance than Nibble 6 (22g) corresponding to 20 bits 27, 26, 25 and 24 since bits 31, 30, 29, and 28 have a higher order of significance than bits 27, 26, 25 and 24. Accordingly, Nibble n will have a higher order of significance than Nibble (n-1).

Each nibble 22a through 22h further has a corresponding "position bit value" assigned thereto. The "position bit value" inversely corresponds to the nibble's order of significance such that nibble 7 (22h) is assigned "000", nibble 6 (22g) is assigned "001", nibble 5 (22f) is assigned "010", nibble 4 (22e) is assigned "101", nibble 1 (22b) is assigned "110", and nibble 0 (22a) is assigned "111". As described further below and in conjunction with FIG. 5, each nibble's "position bit value" is provided to filter circuit 16 for calculation of the count of leading zeros in OPERAND A.

Referring back to FIG. 1, as well as FIG. 2, the select circuit 12 receives as its input A<31:0>18 and is operatively coupled to the filter circuit 16 to provide a plurality of select signals 24 to the filter circuit 16. The select circuit 12 further provides output LZD<5>26 which is bit 5 of the result of the count of leading zeros in OPERAND A. LZD<5>26 indicates whether or not operand A<31:0>18 comprises all zeros. Where A<31:0>18 comprises all zeros, LZD<5>26 will have a "1" value. Otherwise, LZD <5>28 will have a "0" values. The select circuit 12 is described more fully below in conjunction with FIG. 3.

Figure 4:
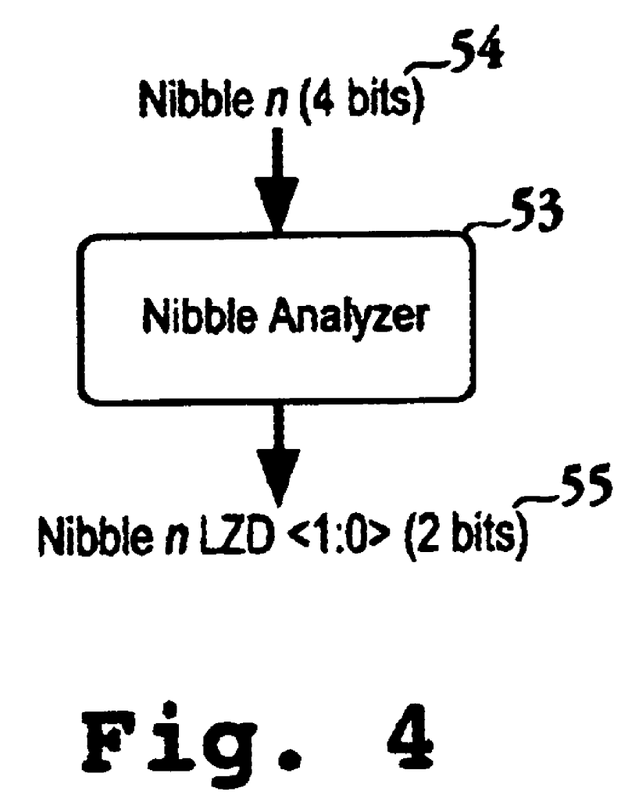
FIG. 4 is a functional block diagram depicting the nibble leading zero analyzer process in accordance with the present invention.

The nibble analyzer 14 receives as its input A<31:0>18 and carries out the parallel nibble calculation of the present invention. FIG. 4 depicts a single nibble analyzer for calculating the leading zeros in a single nibble. In the present example where the operand A<31:0>18 comprises 32 bits, the nibble analyzer circuit will comprise eight (8) nibble analyzers (as depicted in FIG.4 and described below), one nibble analyzer for each nibble 22a through 22h. Preferably the process carried out by the nibble analyzer is performed simultaneously (i.e., in parallel). As described below, each nibble analyzer provides a nibble calculation which indicates the number of leading zeros (nibble count calculation) in the corresponding nibble. The nibble analyzer 14 is further coupled to the filter circuit 16 and provides as its output to circuit 16 the nibble count calculation. Nibble analyzer 14 is described more fully below in conjunction with FIG. 4.

The filter circuit 16 receives as it input the nibble count calculations from the nibble analyzer 14. As described below, each nibble calculation is associated with a "position bit value". The filter circuit 16 also receives the select signals 24 from the select circuit 12 to select the appropriate nibble calculation (and its associated position bit value. The filter circuit 16 provides the output signal LZD <4:0>28 which comprises bits 0 through 4 of the result of the count of leading zeros in OPERAND A. As noted above, LZD <5> is provided by the select circuit 12. LZD<5>26 in combination with LZD<4:0> provides the count of leading zeros in OPERAND A In the case where A<31:0>18 comprise all zero values, LZD<5> will have a "1" value, and LZD<4:0> will have "00000" as its value. The resulting count of leading zeros will thus be "100000" (i.e., 32) in this case. The filter circuit 16 is described in more detail below in conjunction with FIG. 5.

Referring next to FIG. 3, as well as FIG. 1 and FIG. 2., an illustrative select circuit 12 according to the present invention is shown. A<31:0>18 is received into and operated on by select circuit 12 according to nibbles (nibble 0 (22a) through nibble 7(22h)).

Each nibble 22a through 22h is evaluated by a first NOR gate 30a through 30h, respectively. For example, Nibble 0 (22a) is evaluated by NOR gate 30a. The output of each OR gate 30a through 30h produces an output 32a through 32h, respectively, according to the data in each nibble such that a "0" output indicates that the corresponding nibble does not contain all zero values and a "1" output indicates that the corresponding nibble comprises all zero values. For example, if each bit 28 through 31 of Nibble 22h (i.e., A<28:31>) comprises a "0" value, then output 32a (N7allzero) of NOR gate 30h would be "1". Otherwise a "0" is indicated.

Output of NOR gate 30c and 30d drive an AND gate 34 to generate output N32allzero 36 which indicates a "1" when both nibble 2 (22c) and nibble 3 (22d) comprise all zero values. Otherwise a "0" is indicated. Similarly, output of NOR gate 30g and 30h drive AND gate 38 to generate output N76allzero (40) which indicates a "1" when both nibble 22g and 22h comprise all zero values. Otherwise a "0" is indicated.

Output of AND gate 38 and outputs of NOR gates 30e and 30f drive AND gate 42 to generate output N7654allzero 43 which indicates a "1" when all of the nibbles 22e through 22h comprise all zero. Otherwise a "0" is indicated.

Outputs of AND gates 34 and 42 and outputs of NOR gates 30a and 30b drive AND gate 44 to generate output N76543210 (45), which also identifies LZD<5>26. As noted above, LZD<5>26 (and N76543210 (45)) will indicate "1" when all nibbles 22a through 22h comprise all zero values. Otherwise a "0" is indicated. As noted above, LZD<5> provides bit 5 of the count of leading zeros OPERAND A.

Output of NOR gates 30a and 30b drive AND gate 46 to generate output N10allzero 47 which indicates a "1" when both nibble 0 (22a) and nibble 1 (22b) comprise all zero values. Output of NOR gate 30b drives INVERTER 48 to generate output N1notallzero 49 which indicates a "1" when nibble 1 (22b) does not comprise all zero values. The signal 32a is inverted by INVERTER 50 and is then fed to AND gate 51. AND gate 51 receives as its other input signal 32b and provides as its output N1allzeroN0notallzero (52). N1allzeroN0notallzero (52) indicates a "1" when nibble 0 (22a) comprises all zero values but nibble 1 (22b) does not comprise all zero values.

Signals N1allzero (32b), N3allzero (32d), N5allzero (32f), N7allzero (32h), N32allzero (36), N76allzero (40), N7654allzero (43), N10allzero (47), N1notallzero (49) and N1allzeroN0notallzero (52) are provide as "select signals" 24 to the filter circuit 16 as described below. These select signals are used to select a nibble count calculation corresponding to the highest order nibble without all zero values.

Referring now to FIG. 4, as well as FIG. 1 through FIG. 3, a single "nibble analyzer" 53 in accordance with the present invention is shown. As noted above, the invention provides a nibble analyzer 53 for each nibble in the operand. Thus for a 32-bit operand, eight nibble analyzers are provided, one nibble analyzer 53 for each nibble.

The nibble analyzer 53 receives as its input, the four bits of the nibble 54, and generates output Nibble n LZD<1:0>55. The following truth table (Table 1) provides the logic used by the nibble analyzer 53 to generate Nibble n LZD<1:0>55:

TABLE 1

| Nibble n bit pattern | Nibble n LZD <1:0> |
| --- | --- |
| 1*** | 00 |
| 01** | 01 |
| 001* | 10 |
| 0001 | 11 |
| 0000 | 00 |

The logic defined in Table 1 may be carried out using conventional logic circuit as is known in the art. In Table 1, the first column provides the bit pattern detected by the nibble analyzer 53 and the associated right column provides the LZD <1:0> value 55 for the corresponding bit pattern. An asterisk (*) in the bit pattern indicates that the value is not relevant for the purposes of determining LZD 55. For example, a bit pattern of "0110" corresponds to an LZC value of "01". The generated LZD value 55 for each nibble is then provided to the filter circuit 16 described below in conjunction with FIG. 5.

Figure 5:
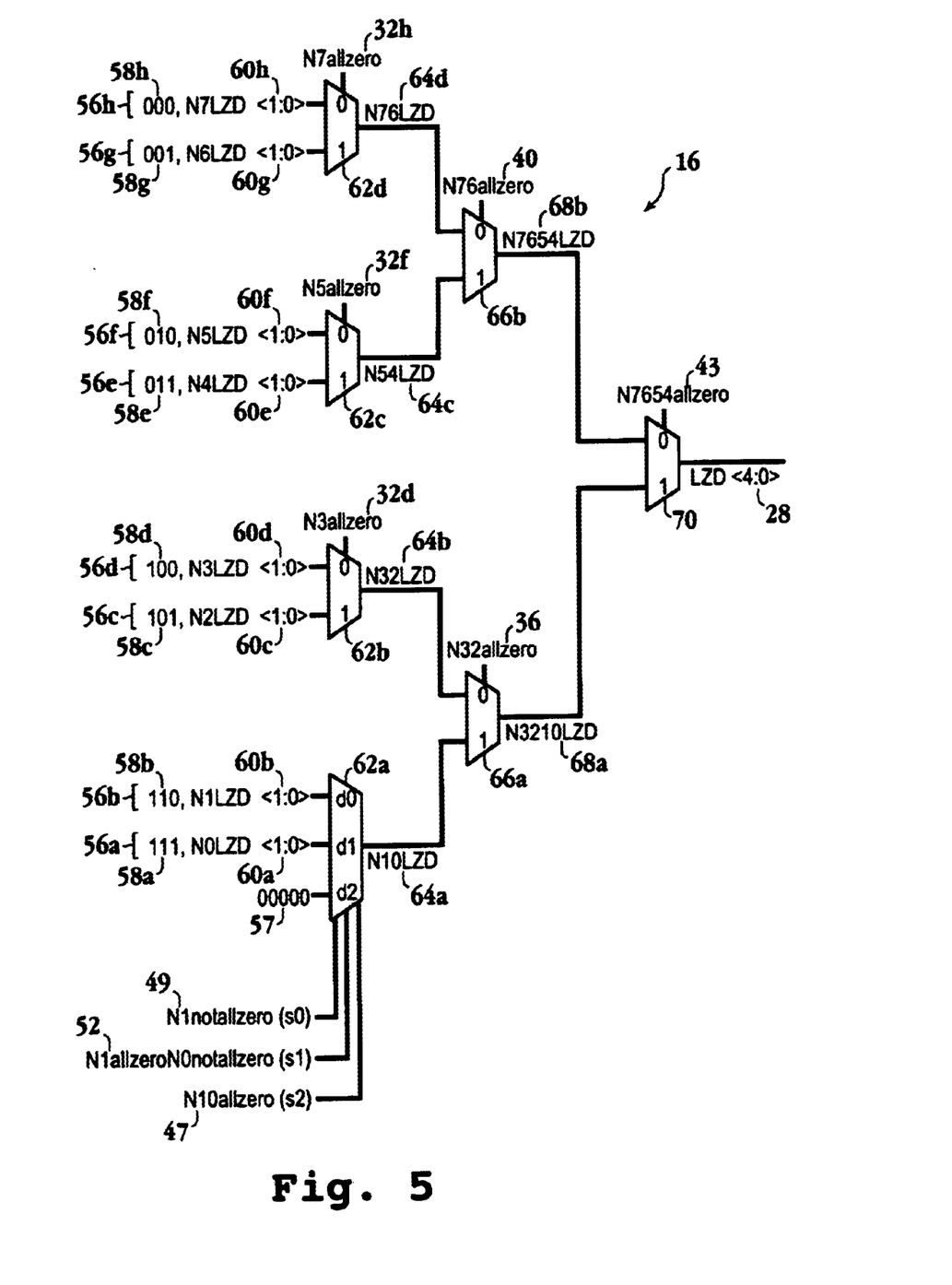
FIG. 5 is a functional block diagram of the filtering circuit in accordance with the present invention.

Referring now to FIG. 5, as well as FIG. 1 through FIG. 4, a block diagram of an exemplary filter circuit 16 in accordance with the present invention is shown. Filter circuit 16 receives as its input a plurality of operands, identified as 56a through 56h. Filter circuit 16 also receives the select signals 24 from select circuit 24. A special signal feed "00000" (designated 57) is also provided for the special case where operand A<31:0> comprises all zeros.

Each of the operands 56a through 56h relates to a corresponding nibble 22a through 22h. For example, operand 56a relates to nibble 0 (22a), and operand 56h relates to nibble 7 (22h). More particularly, each operand 56a through 56h comprises an associated nibble "position bit value" (58a through 58h, respectively) and an associated nibble count calculation (60a through 60h, respectively).

As described above, each nibble is associated with a "position bit value" inversely corresponding to the nibble's order of significance. For example, the highest order nibble 7 (22h) has the lowest position bit value "000" (58h); lowest order nibble 0 (22a) has the largest position bit value "111" (58a).

The "nibble count calculation" 60a through 60h of the operand is provided from the nibble analyzers 14, each count nibble calculation corresponding to the count of leading zeros in the particular nibble. For example, nibble 0 LZD<1:0> (represented as N0LZD<1:0> 60a) thus comprises the count of leading zeros in A<3:0> as described above in FIG. 4. The "position bit value" together with the "nibble count calculation" (i.e., operands 56a through 56h) provides bits <4:2> and <1:0>, respectively, of the resulting LZD <4:0>.

Filter circuit 16 carries out the operation of filtering the operands 56a through 56h (and signal feed 57) using the select signals provided by the select circuit 12 to derive the LZD<4:0> which corresponds to the highest order nibble without all zero values. Circuit 16 carries out its filtering by removing half of the operands 56a through 56h (and signal feed 57) at each MUX stage until the remaining operand associated with the highest order nibble without all zero values remains. Accordingly, operand 56a, operand 56b and signal 57 drive multiplexer (MUX) 62a; operand 56c and operand 56d drive MUX 62b; operand 56e and operand 56f drive MUX 62c; and operand 56g and operand 56h drive MUX 62d. It will be apparent to those skilled in the art that multiplexers 62b through 62c operate in the manner as described herein in for MUX 62d. MUX 62a carries out the operation for managing the case where A<31:0> comprises all zero values, as described below.

Each MUX 62b through 62d, receives a select signal from select circuit 12 to select one the input operands. For example, the select signal for MUX 62d is signal 32h (N7allzero). As described above, N7allzero (32h) will be a "1" value if nibble 7 (22h) comprises all zero values. In such case, between nibble 7 (22h) and Nibble 6 (22g), the MUX 62a selects Operand 56g (associated with nibble 6) and Operand 26h (associated with nibble 7) is discarded as irrelevant since the nibble associated therewith comprises all zero values. N7allzero (32h) will be a "0" value if Nibble 7 (22h) does not comprise all zero values. In this case, between Nibble 7 (22h) and Nibble 6 (22g), the MUX 62a selects Operand 56h (associated with nibble 7) and Operand 56g (associated with nibble 6) is discarded since nibble 7 has a higher significance than Nibble 6 and since nibble 7 does not comprise all zero values, and therefore its associated operand 56h is relevant.

The output of MUX 62d is N76LZD (64d) which is the selected operand according to the logic described above, Outputs N10LZD (64a), N32LZD (64b), and N54LZD (64c) are provided by MUX 62a, 62b, 62c respectively for the operands associated with each MUX 62a, 62b, 62c.

A special case is provided with respect to the analysis of nibble 1 and nibble 0 to manage the case where nibble 1 and nibble 0 comprise all zero values. Accordingly, MUX 62a receives three inputs signals (signal feed "00000" 57, to operand 56a and operand 56b). MUX 62a also receives three select feeds (N1notallzero (49), N1allzeroN0notallzero (52), and N10allzero (47)). In operation, MUX 62a selects operand 56b when nibble 1 does not comprise all zero values (i.e., N1notallzero (49) has a "1" value). Where nibble 1 does comprise all zero values, MUX 62a selects operand 56a if nibble 0 does not comprise all zero values (i.e., N1allzeroN0notallzero (52) has a "1" value). Where nibble 1 and 0 comprise all zero values, MUX 62a select signal feed "00000" 57 (i.e., N10allzero (47) has a "1" value).

The output from MUX 62a (64a) and MUX 62b (64b) drive MUX 66a; the output from MUX 62c (64c) and MUX 62d (64d) drive MUX 66b. MUX 66a selects between output 64a and 64b according to signal select line N32allzero (36) provided by select circuit 12. MUX 66b selects between output 64c and 64d according the signal provided by select line N76allzero (40).

The select signal N76allzero (40) will be a "1" value if both nibbles 6 and 7 comprise all zero values. In this case, MUX 66b selects signal 64c, and signal 64d is discarded as irrelevant since the nibbles associated with signal 64d (i.e., nibble 6 and 7) comprise all zero values. N76allzero (40) will be a "0" value if either nibbles 6 or 7 do not comprise all zero values. In this case, MUX 66b selects signal 64d, and signal 64c is discarded since the nibbles associated with output 64d are of higher significance and do not comprise all zero values. The operation of MUX 66a is substantially the same as described herein for MUX 66b.

MUX 66b generates output N7654LZD (designated 68b), and MUX 66a generates output N3210LZD (designated 68a). Signals 68a and 68b drive MUX 70, which receives as its select signal line N7654allzero (36) from select circuit 12. N7654allzero (36) will be a "1" value if each nibbles 4, 5, 6 and 7 comprise all zero values. In this case, MUX 70 selects signal 68a, and signal 68b is discarded as irrelevant since the nibbles associated with signal 68b (i.e., nibble 4, 5, 6 and 7) comprise all zero values. N7654allzero (36) will be a "0" value if any of nibbles 4, 5, 6 or 7 do not comprise all zero values. In this case, MUX 70 selects signal 68b, and signal 68a is discarded since the nibbles associated with signal 68b are of higher significance and do not comprise all zero values.

The resulting output of MUX 70 is a selection of one of the operands (56a through 56h) which corresponds to the highest order nibble without all zero values. As noted above, each operand 56a through 56h provides bits <4:0> of the LZD count of leading zeros. Thus, the select operand (output from MUX 70) provides the LZD <4:0>28 of the count of leading zeros in the operand A<31:0>. LZD <5>is provided from select circuit, as note above.

Accordingly, it will be seen that this invention provides an apparatus and method for detecting leading zeros/ones in a number using a parallel nibble analysis. Although the description above contains many specificities, these should not be construed as limiting the scope of the invention but as merely providing an illustration of the presently preferred embodiment of the invention. For example, while the creation of LZD <4:2>is shown as a fixed binary numbers propagated through multiplexers, it would be trivial for one skilled in the art having the benefit of this disclosure to create LZD <4:2>using discrete logic gates (AND, OR, XOR, etc.). Thus the scope of this invention should be determined by the appended claims and their legal equivalents.

What is claimed is:

1. A method for detecting leading zeros in a number represented by a plurality of four-bit nibbles, each nibble having an associated order of significance, said method comprising:

a) calculating a leading zero count for each nibble in parallel;

b) associating with each leading zero count a position value inversely corresponding to the nibble's order of significance;

c) determining whether each nibble includes all zero values; and d) selecting the leading zero count and its associated position value which corresponds to a highest order nibble without all zero values, wherein signals generated through the determining whether each nibble includes all zero values are used to select the leading zero count.

2. The method of claim 1, wherein the method operation of determining whether each nibble includes all zero values includes, inputting each nibble through a NOR gate.

3. The method of claim 1, wherein the method operation of selecting the leading zero count and its associated position value which corresponds to a highest order nibble without all zero values includes, multiplexing nibble pairs.

4. A program storage device readable by a machine, tangibly embodying a program of instructions executable by the machine to perform a method for detecting leading zeros in a number represented by a plurality of four-bit nibbles, each nibble having an associated order of significance, said program storage device comprising:

a) program instructions for calculating a leading zero cont for each nibble in parallel;

b) program instructions for associating with each leading zero count a position value inversely corresponding to the nibble's order of significance; and c) program instructions for selecting the leading zero count and its associated position value which corresponds to a highest order nibble without all zero values.

5. The program storage device of claim 4, further comprising:

program instructions for determining whether each nibble includes all zero values.

6. The program storage device of claim 4, wherein the program instructions for determining whether each nibble includes all zero values includes, program instructions for inputting each nibble through a NOR gate.

7. A leading zero detector to calculate a count of leading zeros in a number represented by a plurality of four-bit nibbles, each nibble having an associated order of significance, said leading zero detector comprising:

a) a select circuit which receives as its input the number, the select circuit configured to generate a select signal associated with each nibble, the select signal configured to identify whether the corresponding nibble includes all zero values;

b) a plurality of nibble analyzers, one nibble analyzer for each of the nibbles, each said nibble analyzer having as its input a corresponding nibble, each said nibble analyzer is configured to calculate a two bit leading zero count for its corresponding nibble; and c) a filter circuit operatively coupled to said select circuit and said plurality of nibble analyzers, the filter circuit configured to identify a highest order nibble without all zero values from operands composed of both the two bit leading zero count and a position value through select signals provided by the select circuit.

8. The leading zero detector of claim 7, wherein the select circuit includes a plurality of NOR gates, each of the plurality of NOR gates having one of the four bit nibbles as an input, wherein each NOR gate is coupled to an AND gate.

9. The leading zero detector of claim 8, wherein the number is a thirty two bit number.

10. The leading zero detector of claim 9, wherein said plurality of NOR gates includes eight NOR gates.

11. The leading zero detector of claim 7, wherein the position value inversely corresponds to the nibble's order of significance.

12. The leading zero detector of claim 11, where said filter circuit consists essentially of a plurality of coupled multiplexers.

* * * * *